US006215289B1

(12) United States Patent

Simonnet

(10) Patent No.: US 6,215,289 B1
(45) Date of Patent: Apr. 10, 2001

(54) SWITCHABLE D.C. VOLTAGE REGULATION CIRCUIT

(75) Inventor: Jean-Michel Simonnet, Tours (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/179,494

(22) Filed: Oct. 27, 1998

(30) Foreign Application Priority Data

Oct. 31, 1997 (FR) .................................................. 97 13987

(51) Int. Cl.[7] ............................... G05F 1/40; G05B 24/02

(52) U.S. Cl. ............................................. 323/282; 323/349

(58) Field of Search ..................................... 323/282, 349, 323/350; 307/475

(56) References Cited

PUBLICATIONS

French Search Report from French Patent Application 97 13987, filed Oct. 31, 1997.

Sanchez, J.L.: "Light Triggered Thyristor With A MOS Amplifying Gate: An Example Of Functionally Integrated Vertical High Voltage Power Device" Proceedings Of The European Solid State Device Research Conference (ESSDERC), Leuven, Sep. 14–17, 1992, No. Conf. 22, Sep. 14, 1992, Maes H.E.; Mertens R.P.; Van Overstraeten R.J., pp 145–148.

Berriane R., et al. "MOS-Gated Optically Triggered Thyristor" A New Galvanially Insulated High Voltage Integrated Switch Solid State Electronics, vol. 39, No. 6, Jun. 1996, pp 863–869.

*Primary Examiner*—Peter S. Wong
*Assistant Examiner*—Rajnikant B. Patel
(74) *Attorney, Agent, or Firm*—Wolf, Greenfield & Sacks, P.C.; James H. Morris; Theodore E. Galanthay

(57) ABSTRACT

The present invention relates to a switchable d.c. voltage regulation circuit having an input terminal, an output terminal, a reference terminal, and a control terminal, including a gate turn-off thyristor, the main terminals of which are connected to the input terminal and to the output terminal, respectively; a resistor connected between the input terminal and the cathode gate of the thyristor; a transistor, the main terminals of which are connected to the cathode gate of the thyristor and to the reference terminal, respectively; and an avalanche diode connected between the output terminal and the base of the transistor.

22 Claims, 2 Drawing Sheets

SWITCHABLE D.C. VOLTAGE REGULATION CIRCUIT

BACKGROUND OF THE INVENTION

1. Field of the Invention

The present invention relates to a switchable d.c. voltage regulation circuit.

2. Discussion of the Related Art

Such a circuit is schematically shown in FIG. 1 and is referred to with reference 1. It is connected by its input to a d.c. voltage Vin and outputs a voltage Vout which must remain as constant as possible when Vin varies or when the current Iout in a load L varies. This circuit is provided with a control input CTRL to output either voltage Vout or a zero voltage. An application of such a circuit is, in the automobile field, to supply a light-emitting diode or a chain of light-emitting diodes. Such light-emitting diodes can, for example, be used as the third tail light of a car. Thus, voltage Vin is the battery voltage of the vehicle and can vary significantly.

In the following, it will be assumed for simplification that voltage Vin and voltage Vout are positive voltages referenced to the ground.

FIG. 2 shows an elementary voltage regulation circuit. The voltage regulation is performed by an avalanche diode Z, the anode of which is grounded and the cathode of which is connected on the one hand to a regulated output terminal Vout and on the other hand to an input terminal Vin via a resistor R1. A switch such as a transistor TR1 is arranged between terminal Vout and the ground. The base of this transistor receives control voltage CTRL. Thus, when the transistor is off, a voltage Vout substantially equal to the avalanche voltage of avalanche diode Z is present at the output. This circuit has several drawbacks. A first drawback is the presence of power resistor R1. If, for example, output voltage Vout has to be regulated to 10 V and voltage Vin rises to a value of 30 V, the voltage drop across the resistor will be on the order of 20 V and for a resistance of 50 ohms, a dissipated power of 1 Watt is reached. Such power resistors are expensive. Another drawback of the circuit of FIG. 2 is that the current in avalanche diode Z is likely to greatly vary when voltage Vin varies. As a result, the output voltage variation can be significant.

Another series resistor assembly is illustrated in FIG. 3. A resistor R1 is connected between terminals Vin and Vout as in FIG. 2. An avalanche diode Z is connected between the collector and the base of transistor TR1, itself connected between Vout and the ground. A biasing resistor R2 is connected between the base and the emitter of transistor TR1. In this case, the nominal regulation voltage is the voltage of the avalanche diode plus the base/emitter voltage of transistor TR1. The same drawback of use of a series resistor in the main current circuit appears in this assembly. An advantage with respect to the assembly of FIG. 2 is that voltage Vout varies less with the variations of voltage Vin.

To avoid the drawbacks of circuits with a series resistor, circuits in which a semiconductor component, generally less expensive than a power resistor, is arranged in the branch in series between input terminal Vin and output terminal Vout have also been provided in prior art. This semiconductor component further enables to interrupt the current in the power branch and thus to limit losses during phases where a zero output voltage is desired.

FIG. 4 shows an example of a circuit with a gate turn-off (GTO) thyristor. A GTO thyristor Th1 is connected by its anode to terminal Vin and by its cathode to terminal Vout. A resistor R3 is connected between the anode gate and the cathode gate. The cathode gate is grounded via an avalanche diode Z and possibly a forward-biased diode d to perform a temperature compensation function. A transistor TR2 is connected between the cathode gate of thyristor Th1 and the ground. The base of transistor TR2 is connected to a control terminal CTRL. When the transistor is off, the thyristor is normally on under the effect of its gate biasing due to resistor R3. Output voltage Vout is regulated to the cathode/gate voltage drop plus the voltage of avalanche diode Z. When transistor TR2 is turned on, the thyristor turns off and voltage Vout becomes substantially zero. The anode gate could also not be used, and resistor R3 could be directly connected to the thyristor anode. The assembly shown has the advantage of ensuring protection in case of an inversion of the biasing of voltage Vin, which can occur when the voltage source corresponds to an automobile battery.

Another circuit with a semiconductor component is shown in FIG. 5. Thyristor Th1 is replaced with a transistor TR3. The other circuit elements are similar to those of FIG. 4. This circuit notably has the disadvantage of requiring a transistor with a relatively high gain, which is relatively difficult to obtain in the case of a power transistor with a high direct breakdown voltage.

SUMMARY OF THE INVENTION

Thus, the present invention aims at implementing a circuit of the same family as those of FIGS. 4 and 5, that is, in which the connection between the input and output terminals is performed by a semiconductor component, but having a better voltage regulation than known circuits.

Another object of the present invention is to implement such a circuit which is simply integrable in the form of a single semiconductor component.

To achieve these and other objects, the present invention provides a switchable d.c. voltage regulation circuit having an input terminal, an output terminal, a reference terminal, and a control terminal, including a gate turn-off thyristor, the main terminals of which are connected to the input terminal and to the output terminal, respectively; a resistor connected between the input terminal and the cathode gate of the thyristor; a transistor, the main terminals of which are connected to the cathode gate of the thyristor and to the reference terminal, respectively; and an avalanche diode connected between the output terminal and the base of the transistor.

According to an embodiment of the present invention, the resistor is connected between the anode gate and the cathode gate of the thyristor.

The present invention also aims at a monolithic component to implement the above circuit, including an N-type substrate divided in two wells by P-type insulating walls, the thyristor being implemented in a first well in lateral form, the transistor being implemented in a second well in vertical form, and the avalanche diode being implemented by the junction between an $N^+$-type region and the base region of the transistor.

According to an embodiment of the present invention, the rear surface of the well including the thyristor includes a $P^+$-type diffused region.

According to an embodiment of the present invention, this component includes, on its rear surface side, an insulating layer under the insulating walls.

According to an embodiment of the present invention, the resistor is formed of a lightly-doped P-type layer in contact with the cathode gate region.

The foregoing objects, features and advantages of the present invention, will be discussed in detail in the following non-limiting description of specific embodiments in connection with the accompanying drawings.

DETAILED DESCRIPTION

Figure 6:
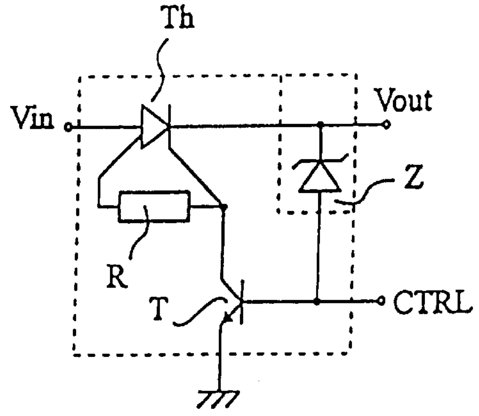
FIG. 6 shows a switchable regulation circuit according to the present invention.

As is shown in FIG. 6, the present invention provides a regulation circuit with a series semiconductor component, this component being a GTO-type thyristor.

In the case where voltages Vin and Vout are positive, the thyristor anode is connected to terminal Vin and the thyristor cathode is connected to terminal Vout. The anode, or preferably the anode gate, of the thyristor, is connected to its cathode gate by a biasing resistor R. The cathode gate of thyristor Th is also connected to the collector of an NPN-type transistor T, the emitter of which is grounded. Output terminal Vout is connected to the base of transistor T via an avalanche diode Z. The base of transistor T is also connected to a control terminal CTRL meant to saturate the transistor when GTO thyristor Th is desired to be turned off.

This circuit has at least one of the three following advantages with respect to the various prior art circuits:

- it is naturally temperature regulated,
- the output voltage is better stabilized,
- it is simply implementable in the form of an integrated circuit.

The first advantage, that is, the temperature regulation, results from the series connection of avalanche diode Z with the base/emitter junction of transistor T.

Figure 1:
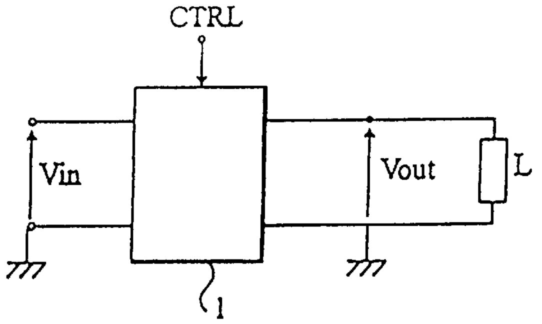
FIG. 1 is a block diagram of a regulation circuit.
Figure 2:
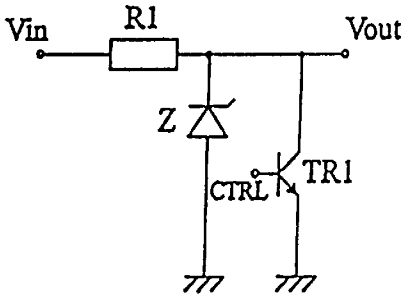
FIG. 2 (PRIOR ART)
FIGS. 2 to 5 show several switchable regulation circuits according to prior art.
Figure 3:
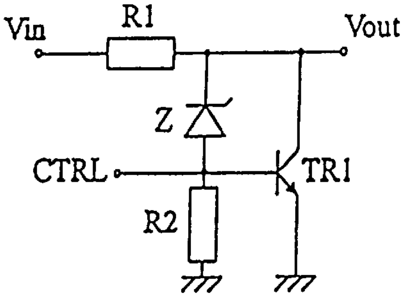
FIG. 3 (PRIOR ART)
Figure 4:
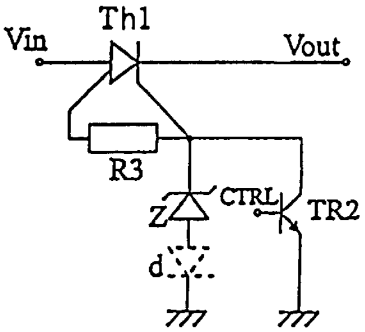
FIG. 4 (PRIOR ART)
Figure 5:
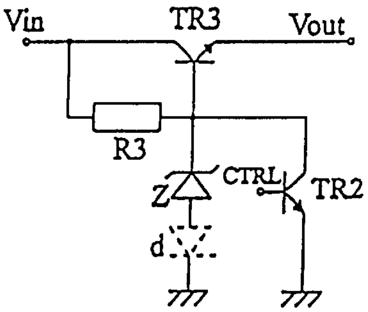
FIG. 5 (PRIOR ART)

The second advantage, that is, the output voltage stability when the input voltage varies, has been checked experimentally and can be expressed by the following tables of comparison between the assemblies of FIGS. 4 and 6. Table I corresponds to an operation at ambient temperature and table II corresponds to an operation at 100° C. In these tables, Iin and Iout respectively designate the input and output currents (in mA) and the voltages are expressed in volts. In all cases, an avalanche diode Z having an avalanche voltage of 10 V has been chosen.

TABLE I (ambient temperature)

| | FIG. 4 (with diode d) | | | | | FIG. 6 | | | | |
|---|---|---|---|---|---|---|---|---|---|---|
| Vin | 10 | 20 | 30 | 40 | 50 | 10 | 20 | 30 | 40 | 50 |
| Vout | 8.2 | 10.3 | 10.6 | 10.8 | 11.1 | 8.2 | 10.7 | 10.7 | 10.7 | 10.7 |
| Iin | 53 | 96.7 | 102.6 | 105.8 | 109.7 | 52.8 | 110.5 | 115 | 116.5 | 121.6 |
| Iout | 53 | 67.4 | 69.2 | 70.3 | 71.9 | 52.9 | 69.7 | 69.7 | 69.7 | 69.7 |

TABLE II (100° C.)

| | FIG. 4 (with diode d) | | | | | FIG. 6 | | | | |
|---|---|---|---|---|---|---|---|---|---|---|
| Vin | 10 | 20 | 30 | 40 | 50 | 10 | 20 | 30 | 40 | 50 |
| Vout | 8.4 | 10.8 | 11 | 11.2 | 11.4 | 8.4 | 11 | 11 | 11 | 11 |
| Iin | 54.2 | 105.3 | 111 | 114 | 116.4 | 54.7 | 115 | 119.8 | 121.7 | 122.3 |
| Iout | 54.2 | 70.1 | 71.9 | 73 | 74 | 54.7 | 71.7 | 71.7 | 71.7 | 71.7 |

These tables show that, from the time when the input voltage is sufficient, output voltage Vout, and thus, output current Iout, are much better stabilized with the device of the present invention than with the device of FIG. 4. The same comparison could be performed with other prior art devices. It has been more specifically performed with that of FIG. 4, since it is the closest diagram to that of the present invention.

Table III hereafter illustrates the stability of output voltage Vout when the load varies, while input voltage Vin is constant (20 V). The resistance of the load is designated by Rout. VZ designates the effective voltage across the avalanche diode (the nominal voltage of which is 10 V) and Vbe designates the effective base-emitter voltage of transistor T.

TABLE III

| | FIG. 4 (with diode d) | | | FIG. 6 | | |
|---|---|---|---|---|---|---|
| Rout | 80 | 200 | 300 | 80 | 200 | 300 |
| Vout(V) | 11.7 | 10.7 | 10.5 | 10.9 | 10.7 | 10.6 |
| Iout(mA) | 145.6 | 52.2 | 34.4 | 134 | 51.9 | 34.5 |
| Vz(V) | 12.3 | 11.3 | 11 | | | |
| Vbe(V) | | | | 0.76 | 0.75 | 0.73 |

Further, as previously indicated, another advantage of the present invention is that the circuit of FIG. 6 is well adapted to being integrated by using conventional thyristor integration techniques, in which the power transistors have relatively low gains.

Figure 7:
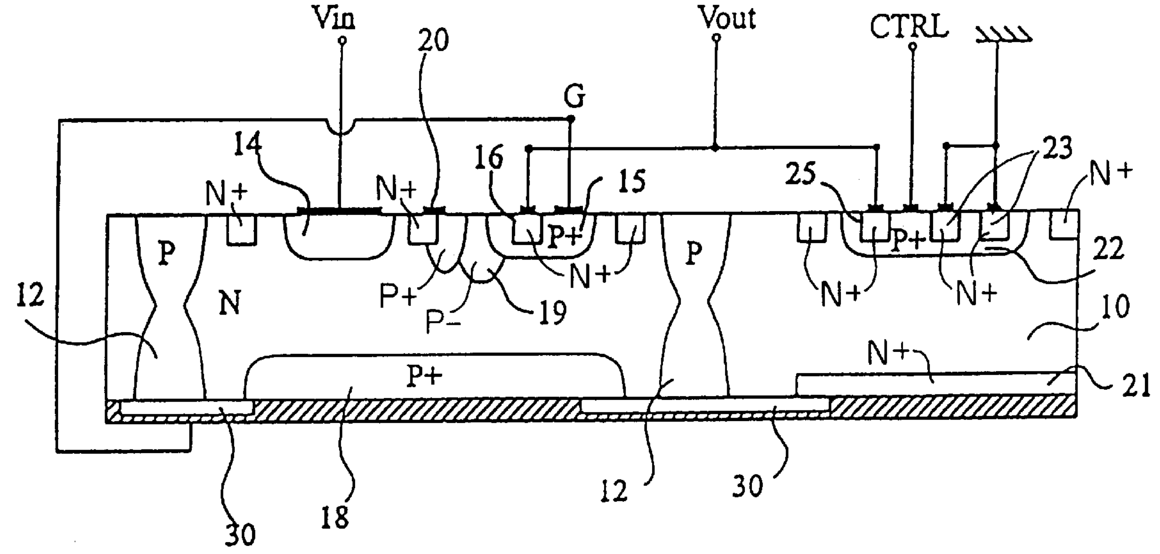
FIG. 7 shows a simplified cross-sectional view of a component implementing the circuit of FIG. 6.

FIG. 7 shows an example of such an integrated structure. This structure is formed from an N-type substrate 10 including two wells separated by a P-type diffusion wall 12.

The GTO-type thyristor is a lateral thyristor implemented in the left-hand well of FIG. 7 and the assembly of transistor T and of avalanche diode Z is implemented in the right-hand well of FIG. 7.

Lateral thyristor Th includes PNPN regions respectively designated with references 14, 10, 15, and 16. Region 14 corresponds to the thyristor anode, region 10 corresponds to the semiconductor substrate, region 15 corresponds to the cathode gate region, and region 16 corresponds to the cathode. Preferably, on the rear surface side, a $P^+$-type region 18 which improves the sensitivity of the GTO thyristor is provided.

Resistor R between the anode gate and the cathode gate is implemented in integrated form and corresponds to a lightly-doped P-type region 19 arranged between cathode gate region 15 and a metallization 20 establishing a contact with region 19 and with substrate 10 (which corresponds to the anode gate region).

In the well of the right-hand side of FIG. 7, transistor T is implemented in vertical form. This transistor includes an $N^+$-type collector region 21 on the rear surface side and, on the front surface side, a P-type base region 22 in which $N^+$-type emitter diffusions 23 are made. In base region 22 is also formed an $N^+$-type region 25 forming with this base a junction corresponding to avalanche diode Z.

The metallizations that form the output terminals and the connections between the different elements have also been shown in the drawing. It should be noted that, on the rear surface side, under insulating wall 12 and reaching $P^+$ region 18 and $N^+$ region 21, is provided an insulating layer 30, the rear surface metallization being uniformly formed over the entire rear surface and contacting regions 18 and 21. Insulating layer 30 avoids possible interactions between the thyristor and the transistor. Gate terminal G is connected by a wire to the rear surface metallization.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A switchable d.c. voltage regulation circuit having an input terminal, an output terminal, a reference terminal, and a control terminal, including:

a gate turn-off thyristor having main terminals connected to the input terminal and to the output terminal, respectively and at least a cathode gate;

a resistor connected between the input terminal and the cathode gate of the thyristor;

a transistor having main terminals connected to the cathode gate of the thyristor and to the reference terminal, respectively and a control electrode coupled to the circuit control terminal; and an avalanche diode connected between the output terminal and the control electrode of the transistor.

2. The circuit of claim 1, wherein the resistor is connected between the anode gate and the cathode gate of the thyristor.

3. A monolithic component to implement the regulation circuit of claim 1, including an N-type substrate divided in two wells by P-type insulating walls, the thyristor being implemented in a first well in lateral form, the transistor being implemented in a second well in vertical form, and the avalanche diode being implemented by the junction between an $N^+$-type region and the base region of the transistor.

4. The component of claim 3, wherein the rear surface of the well including the thyristor includes a $P^+$-type diffused region.

5. The component of claim 3, including, on its rear surface side, an insulating layer under the insulating walls.

6. The component of claim 3, wherein the resistor is formed of a lightly-doped P-type layer in contact with the cathode gate region.

7. The circuit of claim 1, wherein the main terminals of the gate turn-off thyristor comprise respective cathode and anode terminals, said anode terminal connected to the circuit input terminal and said cathode terminal connected to the circuit output terminal.

8. The circuit of claim 7, wherein said gate turn-off thyristor also has an anode gate, and said resistor is coupled between the anode gate and the cathode gate of the thyristor.

9. The circuit of claim 8, wherein the circuit is absent any other resistor connected to the control electrode of the transistor.

10. A monolithic voltage regulator comprising:

an N-type substrate;

a P-type insulating wall for dividing the N-type substrate into at least two separate wells;

a thyristor component implemented in the first well in lateral form and including at least an anode region, a cathode gate region and a cathode region;

a transistor component implemented in the second well in vertical form and including base, emitter and collector regions;

and an avalanche diode component also implemented in the second well and including a P-N junction formed between an $N^+$-type region and the base region of the transistor component.

11. A monolithic voltage regulator according to claim 10 including a resistor component implemented in the first well and including a lightly-doped region in contact with the cathode gate region.

12. A monolithic voltage regulator according to claim 11, wherein said lightly-doped P-type region, and said cathode gate region is also P-type.

13. A monolithic voltage regulator according to claim 12 including a metallization establishing a contact between the lightly-doped region and the substrate.

14. A monolithic voltage regulator according to claim 10, wherein said thyristor component comprises a P-type anode region, a P-type cathode gate region, and an N-type cathode region.

15. A monolithic voltage regulator according to claim 10, wherein said transistor component includes an $N^+$-type collector region on the rear surface side and, on the front surface side, a P-type base region in which $N^+$-type emitter diffusions are made.

16. A monolithic voltage regulator according to claim 15, wherein said base region is also formed with an $N^+$-type region formed with the base region, a junction forming the avalanche diode component.

17. A monolithic voltage regulator according to claim 10, wherein the rear surface of the first well that includes the thyristor component has a $P^+$-type diffused region for improving sensitivity.

18. A monolithic voltage regulator according to claim 10 including an insulating layer on the rear surface of the substrate under said insulating wall.

19. A monolithic component adapted to implement a regulation circuit and comprising;

an N-type substrate;

a P-type insulating wall for dividing the substrate into two wells;

a thyristor implemented in the first well and arranged in a lateral form;

a transistor implemented in the second well and arranged in a vertical form;

and an avalanche diode also implemented in the second well and including a junction formed between an $N^+$-type region and a base region of the transistor.

20. A monolithic component according to claim 19, wherein the rear surface of the well including the thyristor includes a $P^+$-type diffused region.

21. A monolithic component according to claim 19, including, on its rear surface side, an insulating layer under the insulating walls.

22. A monolithic component according to claim 19, including a resistor connected between the input terminal and the cathode gate of the thyristor, wherein the resistor is formed of a lightly-doped P-type layer in contact with the cathode gate region.

* * * * *